Sept. 22, 1931.  J. C. KARNES ET AL  1,824,085
CAMERA MOUNTING
Filed June 12, 1930
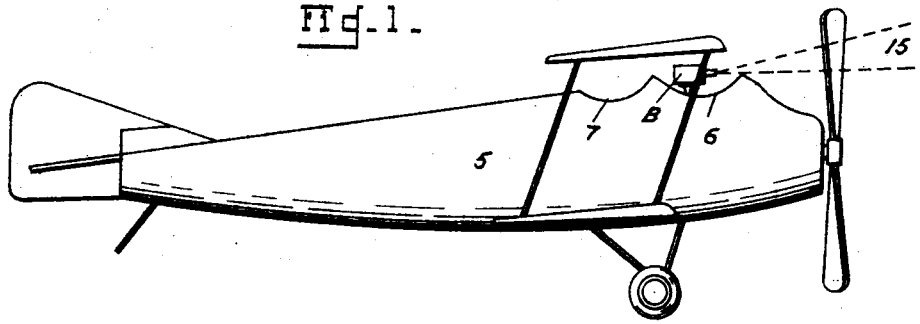
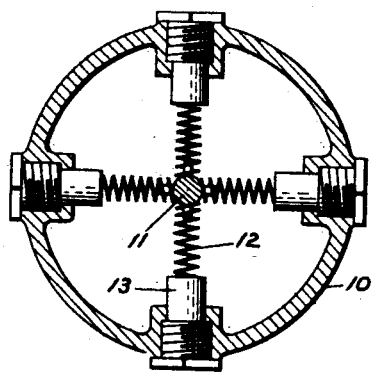
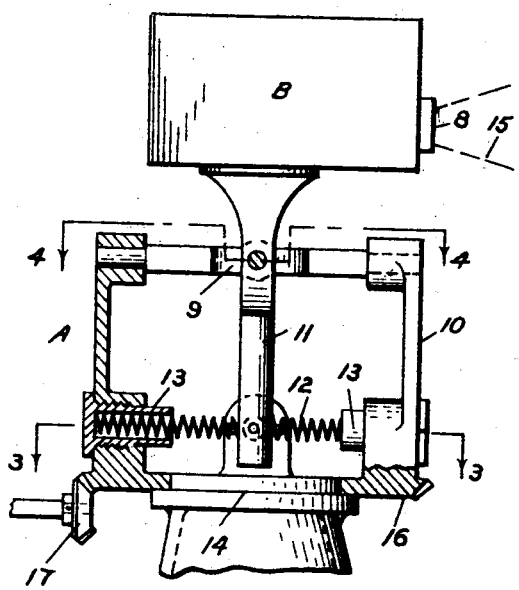
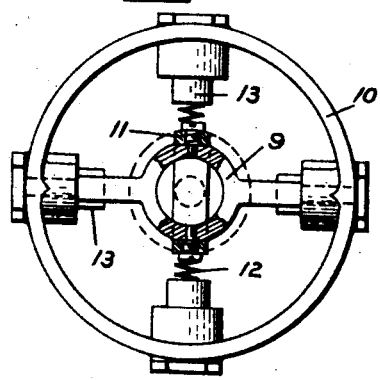
INVENTORS
J. C. Karnes
BY G. J. Kessenich
W. N. Roach
ATTORNEY Patented Sept. 22, 1931

1,824,085

UNITED STATES PATENT OFFICE

JAMES C. KARNES, OF BUFFALO, NEW YORK, AND GREGORY J. KESSENICH, OF MADISON, WISCONSIN

CAMERA MOUNTING

Application filed June 12, 1930. Serial No. 460,738.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to us of any royalty thereon.

This invention relates to a camera mounting.

The purpose of the invention is to provide a camera mounting wherein the camera is capable of bodily displacement due to inertia when a vehicle in which the camera is carried undergoes a change in direction. The field of view of the camera is thereby subject to variations and produces a film or image record showing changes in environment that are illustrative of actual conditions as presented to an occupant of the vehicle. When the film is presented on a screen an impression of reality is conveyed to the observer.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of an airplane equipped with the camera mounting forming the subject of the invention;

Fig. 2 is a detail view in side elevation, parts being in section, of the mounting;

Fig. 3 is a sectional view on the line 3—3 of Fig. 2; and

Fig. 4 is a sectional view on the line 4—4 of Fig. 2.

Referring to drawings by characters of reference:

There is shown in Fig. 1 an airplane fuselage 5 having the front seat or cockpit 6 and a rear seat or cockpit 7. For the purpose of the following description the pilot of the airplane occupies the rear seat and operates the controls during flight.

Over the front seat there is a camera mounting A arranged to support a camera B at the approximate position of the head of an occupant of the seat so that the focal lens 8 of the camera is representative of the eyes of the occupant. The camera is trunnioned in a gimbal ring 9 which in turn is trunnioned in a support 10 in the conventional manner.

Depending from the camera is a bar 11 which is held by a plurality of springs 12, four being shown and preferably corresponding with and parallel to the trunnions. The outer ends of the springs are confined by seats 13 threaded in the support 10.

The support 10 is rotatably mounted on a fixed base 14 in such a position that the camera is normally perpendicular to the longitudinal axis of the airplane and the line of sight 15 represents the line of sight that would exist for the occupant of the seat. Due to the inertia of the camera any change in direction of the airplane will produce a movement of the camera corresponding to the movement of an occupant in that position in the airplane. The line of sight or the field of view of the camera will thereby be changed and record a variation in the normal environment. When the film is projected on to a screen, an impression of reality will be conveyed to the observer.

A film of this character is useful in giving a student pilot the "feel" of the air without actually flying and is to be used in conjunction with a set of training controls operated by the student when viewing the picture.

Under certain circumstances such as in formation flying it is desirable to shift the line of sight laterally to simulate a corresponding movement of the line of sight of the pilot and to this end the support 10 is provided with gear teeth 16 meshing with a driving gear 17 which is under the control of the pilot in the rear seat.

We claim:

1. In combination with a vehicle, a support therein, a gimbal ring on the support, a camera trunnioned in the gimbal ring with its field of view corresponding to the field of view of an occupant in normal position in the vehicle, a depending member on the camera, springs acting on the depending member from different points to maintain the camera in a predetermined position, and means for rotating the support.

2. In combination with a vehicle, a support therein, a gimbal ring on the support, a camera trunnioned in the gimbal ring with its field of view corresponding to the field of view of an occupant in normal position in the vehicle, a depending member on the camera and springs acting on the depending member from different points to maintain the camera in a predetermined position.

3. In combination with a vehicle, a camera mounted in the vehicle with its field of view corresponding to the field of view of an occupant in normal position in the vehicle, and means normally maintaining the camera in a predetermined position.

4. In combination with a vehicle, a camera universally mounted in the vehicle and resilient means normally maintaining the camera in a predetermined position.

5. In a camera mounting, means for universally mounting a camera and resilient means normally maintaining said mounting means in a predetermined position.

JAMES C. KARNES.
GREGORY J. KESSENICH.